United States Patent [15] 3,657,487
Schwanck et al. [45] Apr. 18, 1972

[54] TELEPHONE SUBSET USING MODULAR CONSTRUCTION

[72] Inventors: Gunter Schwanck; Heinz Ruster, both of Berlin; Wolfgang Gruger, Stuttgart-Zuffernhausen; Ernst Manteuffel, Berlin, all of Germany

[73] Assignee: International Standard Electric Corporation, New York, N.Y.

[22] Filed: Sept. 12, 1969

[21] Appl. No.: 9,460

[52] U.S. Cl. ........................179/100 R, 179/100 D, 179/179
[51] Int. Cl. ........................H04m 1/02
[58] Field of Search ..................179/100 D, 100 R, 178, 179

[56] References Cited

UNITED STATES PATENTS

| | | | |
|---|---|---|---|
| 3,400,226 | 9/1968 | Krumreich et al. | 179/179 |
| 3,293,373 | 12/1966 | Lohs | 179/100 D |
| 3,293,372 | 12/1966 | Lohs | 179/100 D |
| 3,126,454 | 3/1964 | Fresk et al. | 179/100 D |
| 3,133,163 | 5/1964 | Persson et al. | 179/179 |

*Primary Examiner*—Kathleen H. Claffy
*Assistant Examiner*—Randall P. Myers
*Attorney*—C. Cornell Remsen, Jr., Walter J. Baum, Percy P. Lantzy, J. Warren Whitesel, Delbert P. Warner and James B. Raden

[57] ABSTRACT

In a table-type telephone subset all of the substantial individual parts such as the base plate, the housing, the cradle-switch, the number-switch, the electric bell or ringer and the bell domes, as well as the base plate of the number switch and the terminal box are provided with hooks shaped thereto, and with corresponding cutouts or indentations, and are assembled in accordance with the known "snap-in" technique.

8 Claims, 10 Drawing Figures

INVENTORS
G.SCHWANCK, H.RUSTER, W.GRUEGER
and E. MANTEUFFEL

BY D. P. Warner
ATTORNEY

INVENTOR

G. SCHWANCK, H.RUSTER, W.GRUEGER
and E. MANTEUFFEL

BY O. O. Warner

ATTORNEY

Patented April 18, 1972 3,657,487

4 Sheets-Sheet 3

INVENTORS

G.SCHWANCK, H.RUSTER, W.GRUEGER
and E. MANTEUFFEL

BY O. O. Warner

ATTORNEY

INVENTORS
G.SCHWANCK, H.RUSTER, W.GRUEGER
and E. MANTEUFFEL

BY D. A. Warner
ATTORNEY

TELEPHONE SUBSET USING MODULAR CONSTRUCTION

The present invention relates to a telephone subset, such as a simple table or wall telephone set, comprising all necessary elements, such as number switch, cradle switch, grounding key, visual indicator, ringer with bell domes, and the remaining switching elements, as well as the connecting lines and holding arrangement therfor, and furthermore with connecting cable and terminal box. The set which is placed on a base plate and is covered by a housing, is to be constructed in such a way that all or at least most of its constituent parts can be assembled, by requiring a minimum number of mounting elements and a minimum of assembling work, within the shortest time and without requiring any special skill, so as to keep the manufacturing costs for the finished set at a very low level. One substantial saving is nowadays already achieved by using finished conductor boards with printed circuits instead of the former wiring.

A further simplification of the assembling work is made possible, according to the invention, in that both the base plate and the housing of the set and, if so required, both the base plate and the cover of the terminal box or of the attachment respectively, are provided with hooks shaped thereto, or with similar holding arrangements serving the connection of both the base plate and the housing and for firmly holding in position the number switch of the housing, as well as several or all remaining parts of the set which are merely pressed on to the base plate, the conductor board, or the housing, for snapping into the holding arrangement.

The present invention will now be described with reference to the example of a telephone subset shown in the accompanying drawings, in which.

Figure 4A:
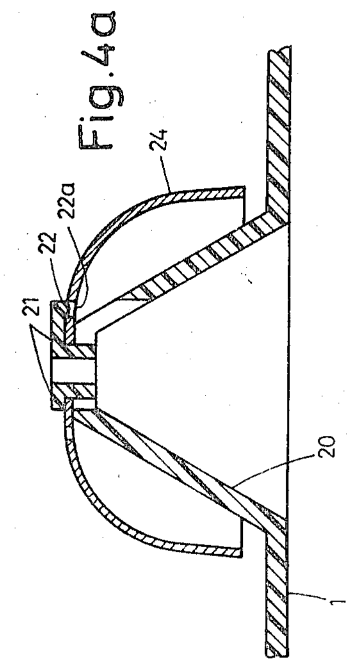
Figure 3A:
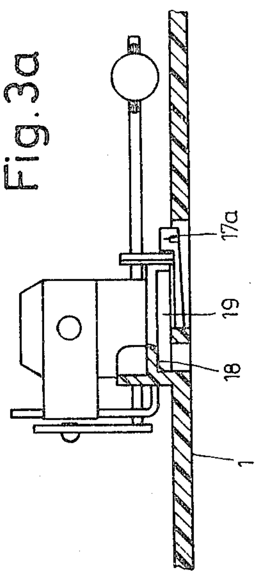
Figures 3B, 4B:
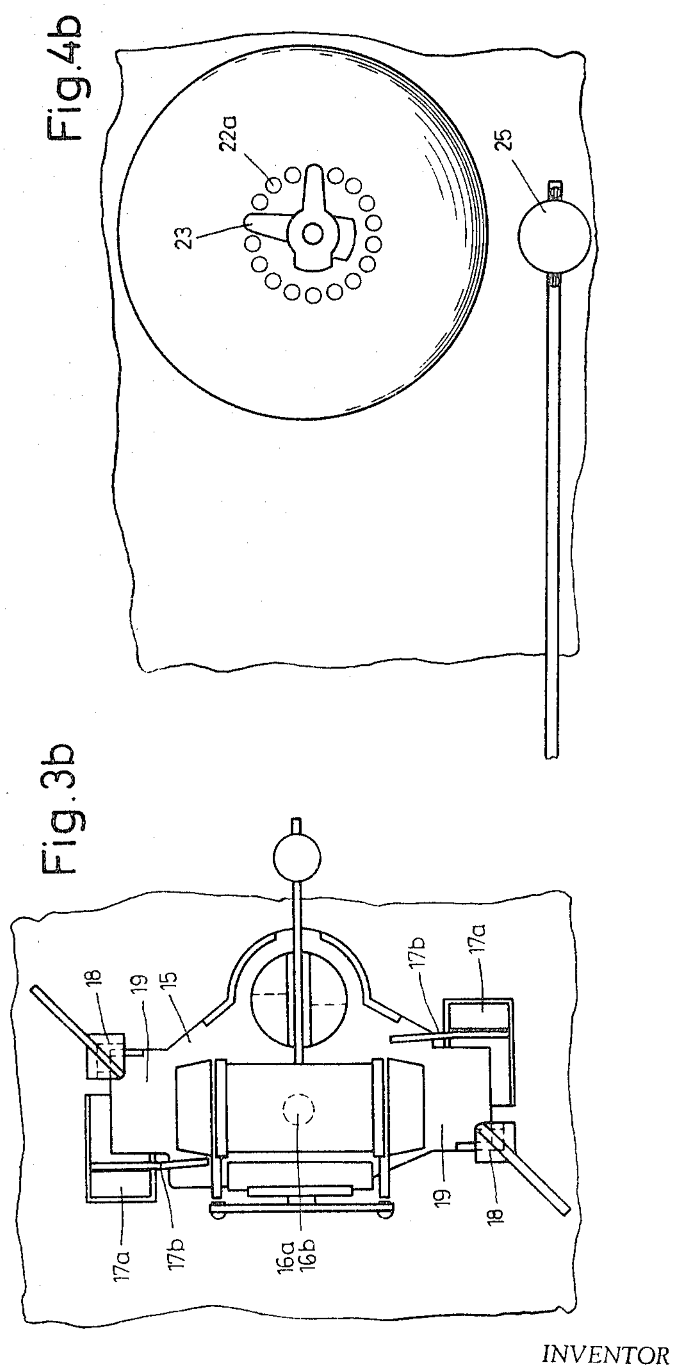
Figure 5A:
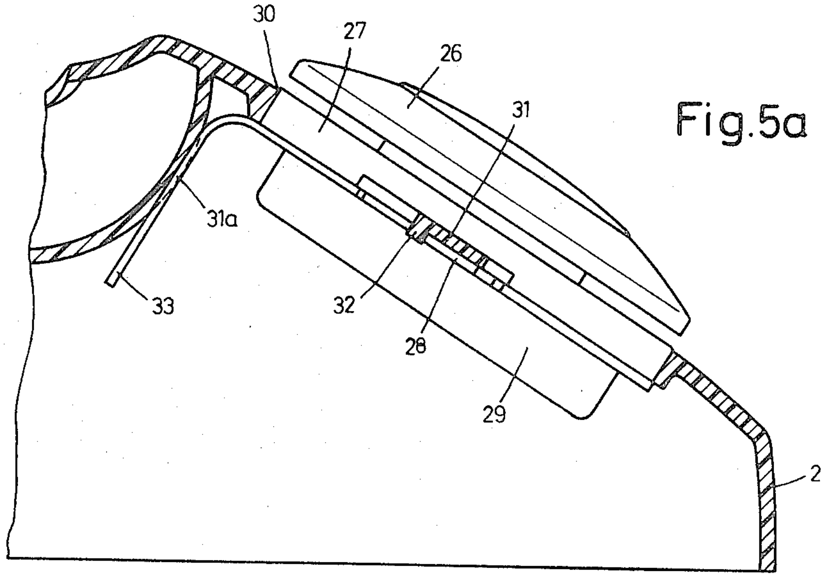
Figure 5B:
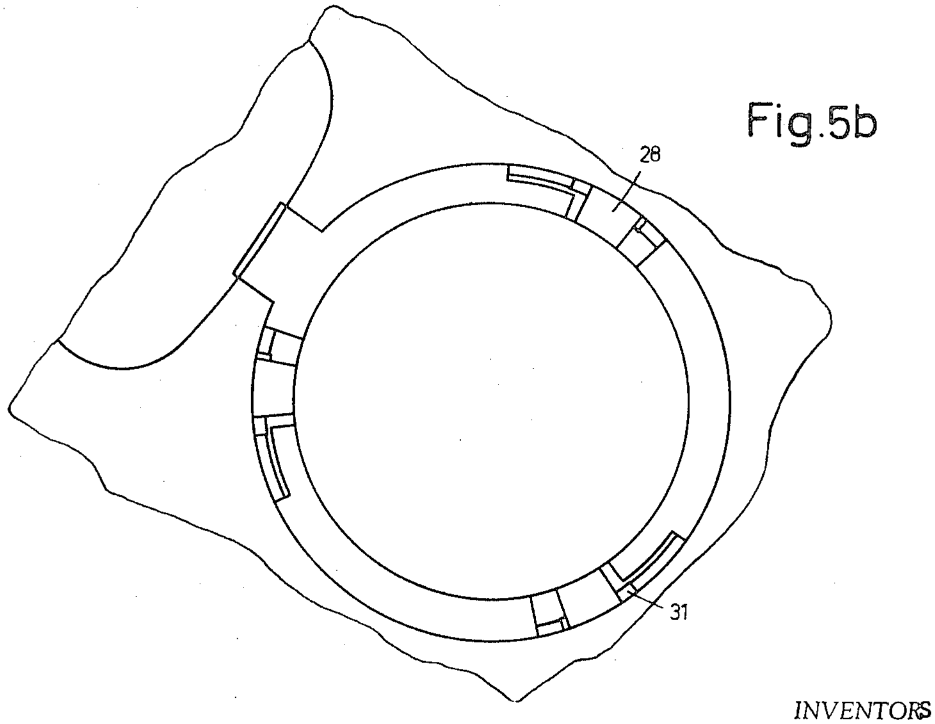
Figure 6B:
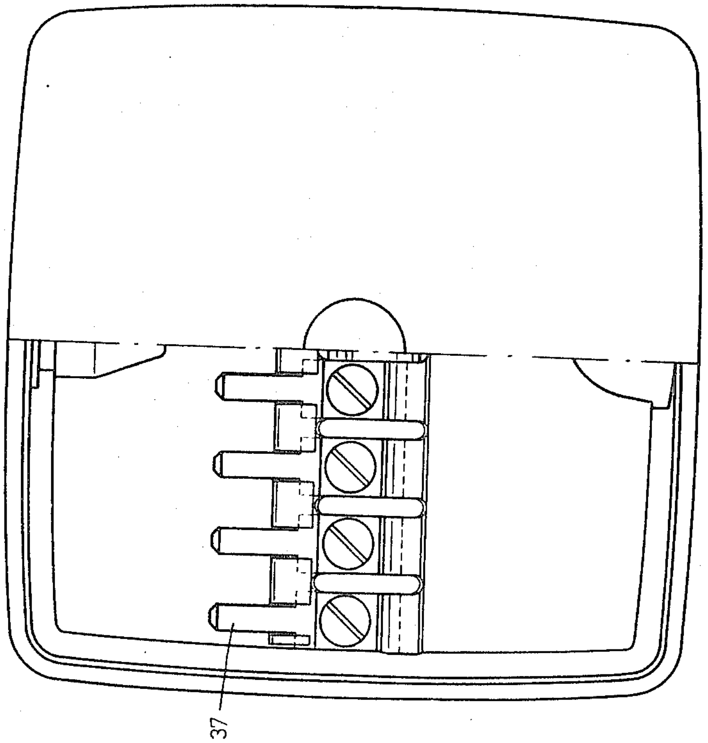
Figure 6A:
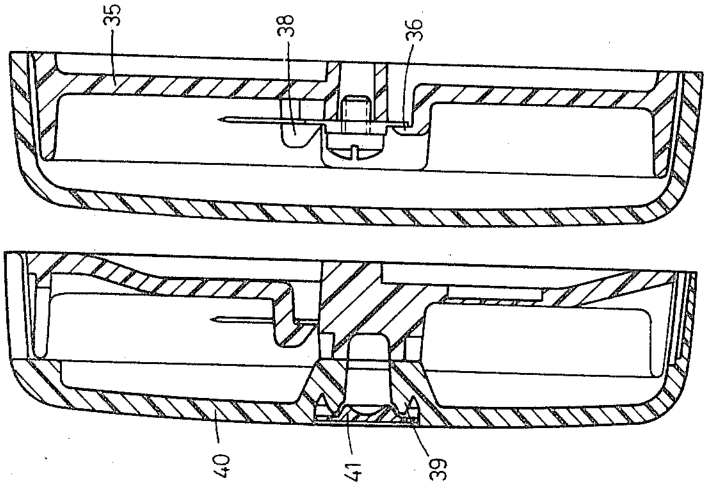

FIG. 3*a* and 3*b*, in a side view and in a top view, show the mounting of the ringer on to the base plate;

FIGS. 4*a* and 4*b*, in a sectional and top view, show the mounting of the bell domes;

FIGS. 5*a* and 5*b* show the mounting of the number switch to the housing, whereas FIGS. 6*a* and 6*b* show the terminal box, on an enlarged scale, in a sectional and top view.

Figure 1:
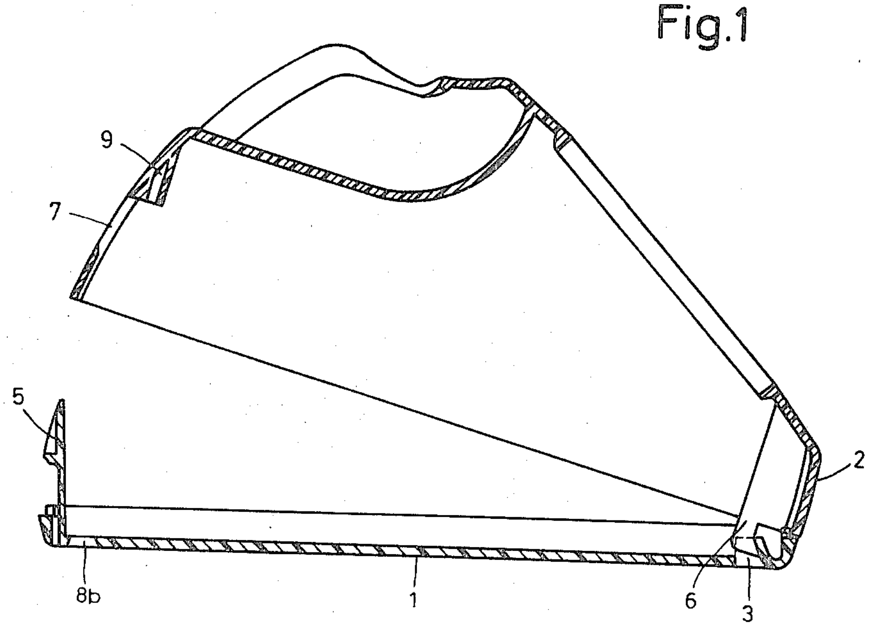
FIG. 1 shows, in a sectional view, both the housing and the base plate with the devices serving to connect both parts to one another.

The base plate 1 of the subset which is shown with the housing 2 on a small scale in FIG. 1, in a sectional view, is provided on its front side with two or more slots 3 and, on its rear side, one or more hook-shaped projections 5. On its front side, the housing is provided with a corresponding number of flaps 6 which are introduced into the slots 3 provided in the base plate 1, so as to be capable of being applied in a hinge-like fashion to the base plate 1. On the rear side of the housing 2 and at a suitable distance from the edge, there is provided a number of holes or recesses 7 corresponding to the number of hook-shaped projections 5.

After the housing 2, with its front side, has been applied with the base plate 1 and thus hinged in a hinge-like fashion, the front side of the housing 2 is pressed upon the base plate 1, thus causing the projections 5 of the base plate to engage the holes or recesses 7 as provided in the housing, for being retained thereby. Any unauthorized opening of the subset by lifting the housing, can be prevented by providing a locking. A locking or sealing pin 8*a*, (not shown) which is arranged in a bore hole 8*b* in the base plate 1 immediately next to the hook-shaped projections 5, is retained by an abutment 9 in the housing 2 above the recess 7. Only after this pin 8*a* (not shown) has been removed, it is possible to open the subset by pressing the hook-shaped members 5 out of their recesses 7. Basically, there is only required one single hook 5 and one single recess 7 but it is advisable to provide at least two such pairs.

Figure 2:
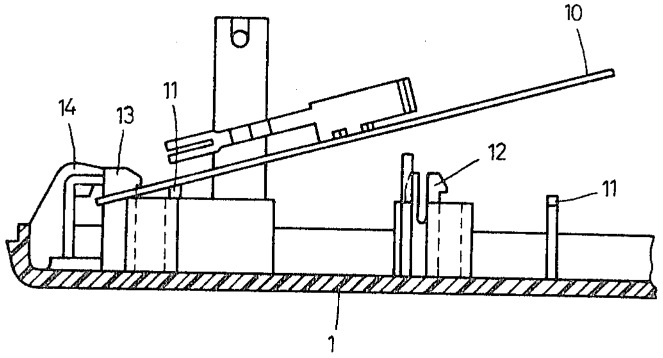
FIG. 2 shows the mounting of the conductor board on to the base plate.

FIG. 2 shows the rear portion of the base plate 1 together with the printed circuit board 10 in almost natural size. The base plate itself consists of one piece comprising the hook-shaped projections 13 and 14, the sideway limitations or holding arrangements 11 for the printed circuit board 10, the upwardly bent rim portion, the projections serving as support for the printed circuit board 10, and a resilient nose-shaped projection 12. The hooks 13 and 14 are arranged on the rear side of the base plate 1 near the edge. The holding arrangements 11 are disposed on both sides of the surface provided for the printed circuit board 10, and the nose-shaped projection 12 is disposed on the front side of this surface. The printed circuit board is brought into the proper position over the surface area provided therefor, and is pressed thereon, thus being locked in position by snap action, and durably retained therein.

In a similar way there is also mounted the ringer, as shown in FIGS. 3*a* and 3*b* in almost natural size. The ringer system itself is likewise mounted to a base plate 15. This base plate is provided with a guide pin 16*a* which is shaped thereto, and which is inserted in a bore hole 16*b* as provided in the base plate 1 of the subset, so that its position thereon is first of all fixed with respect to one point. On diagonally opposite sides the base plate of the subset is provided with two resilient nose-shaped projections 17*a* as shaped thereto, and at the ends of the other diagonal there are provided two roof-shaped extensions 18.

After the ringer system together with the ringer base plate 15 and with its guide pin 16*a* has been inserted into the bore hole 16*b* of the plate 1, the base plate 15 of the ringer system is turned in such a way with respect to the base plate 1 of the subset, that it with the hold surfaces 19 will engage the roof-shaped extensions 18. One of these extensions 18, in the direction of turning constitutes the limit stop for the ringer system. Both of the resilient nose-shaped projections 17*a*, when turning the ringer base plate 15, will engage behind the resilient holding arrangements 17*b*, so that the ringer system base plate 15 is in both directions of turning firmly connected to the base plate 1 of the subset. In order to achieve a mounting or fixing without any clearance, the holding arrangement 17*b* on the base plate 15 of the ringer system, must likewise be of the resilient type, so as to compensate for any tolerances. For removing the system from the base plate 1 of the subset the two resilient nose-shaped projections 17 *a* are pressed down onto the base plate 1 of the subset, and thereafter the ringer-system base plate 15 is turned towards the left.

FIG. 4, on an enlarged scale, shows the mounting of the bell domes 24 to special base-shaped projections 20 forming one structural unit with the base plate 1. The mounting must be made in such a way that the distance between the bell dome edges and the hammer 25 can be readjusted subsequently thereto. The projections 20 are provided on their top side each with a finger-shaped extension 21 which, near to this end, is connected with a circular portion to one end of the top side of the projection 20, or slightly projecting thereout respectively. On the bottom side of the other end there is provided an engaging nipple 22. The hemispherical bell domes 24 are provided on their top side with a cut out portion 23 corresponding to the finger-shaped extension 21, but which is arranged eccentrically in relation to the axis of the circular portion on the bell dome. The extension 21 is inserted through the cutout 23. Moreover, and concentrically in relation to the mounting shaft of said circular portion, there is provided on the bell dome 24 a circle comprising individual bore holes 22a which are separated from one another. When turning the inserted bell dome 24, the engaging nipple 22 as provided on the finger shaped extension 21 will successively engage the engaging holes 22*a* of which this circle is composed. When turned about the eccentrical axis, there is changed the distance between the bell dome 24 and the bell hammer or striker 25. After the proper distance has been adjusted, the engaging or arresting nipple 22 is retained in the respective adjusting or engaging hole 22*a*, and is thus left in the proper engaging position. Also in this case there are not required any special mounting means, such as screws, rivets, split-pins, etc.

FIGS. 5*a* and 5*b* show the mounting of the number switch 26 to the housing 2 of the telephone subset for which likewise no special mounting means are required. For receiving the number switch 26, the housing is provided with an opening 30. In this opening there are provided several holding or supporting straps 31 forming part of the housing 2, and on which there is placed the base plate 27 of the number switch 26. The rear sides of the holding or supporting straps 31 are each provided with an offset limit stop 32, and on the inside of the housing 2 there are provided groove-shaped recesses 31*a* which serve the locking in position of the number switch 26. For being mounted, the number switch 26, after insertion into the opening 30 and upon resting on the holding or supporting straps 31, is turned until meeting against the limit stop 32. In this position, a further holding flap 33 forming part of the base plate 27 or of the protective cover 29 of the number switch, engages the groove-shaped recess 31*a*.

Unlatching is effected by slightly bending the flap 33, whereupon a turning out of the holding arrangement is made possible.

Similar as with the telephone subset, also in the case of the terminal box, i.e. the so-called rosette, both the base plate 35 and the protective cover 40 are made from plastic material. FIGS. 6*a* and 6*b* show one such type of terminal box. In this box there are accommodated up to about eight screw-type contact blades 37 which, with the aid of resilient hook-shaped hold members 38 forming part of the base plate 35, are mounted to the latter. A further hold member 36 takes care of preventing the once inserted screw-type blade contact 37 from dropping out. In the center between the base plate 35 and the hold members 36 and 38 there is arranged a further hold member 39 with the aid of which the protective cover 40 can be fastened. The hold member 39 is so designed that the cover 40 can only be removed again after removing the sealing disk 41 which, at the same time, serves the locking of this hold member.

The telephone subset, including the connecting cable and the terminal box can be assembled without requiring any special skill and without any special tools. Merely the components, such as printed circuit board, ringer system and number switch will have to be prepared. It will be seen that by the absence of special mounting elements for these components, such as screws, rivets, split pins, etc., the expenses for material, and also the assembling time as well as, consequently, the manufacturing costs can be reduced considerably.

We claim:

1. A telephone subset comprising: a plastic base plate, a plastic housing, said base plate and said housing including fasteners integral thereto, the fasteners in said base plate including a slot and a hook-shaped projection, the fasteners in said housing including a flap to engage said slot to provide a hinge-like joint to guide and support the plastic housing relative to the plastic base plate and a recess to engage said hook-shaped projection in a latching action to hold the plastic housing securely against the base plate, a plurality of additional fastening elements in said base plate and said housing, said fastening elements including means for receiving and holding a printed circuit board.

2. A telephone subset according to claim 1, in which the means for receiving and holding includes a plurality of hooks for engaging recesses in the printed circuit board.

3. A telephone subset according to claim 1, in which a ringer system is provided, the ringer system including a ringer base plate and means by which the base plate of the ringer system is fastened to the plastic base plate of the telephone subset.

4. A telephone subset according to claim 3, in which the base plate of the subset is provided with projections shaped to support the bell domes in position, and said projections are provided with resilient hook-shaped holding arrangements extending through cut outs provided in said bell domes, whereby the latter, by being subjected to a turn, can be fixed in position at an adjustable distance from the bell hammer or striker.

5. A telephone subset according to claim 4, in which the hook-shaped holding arrangement at the projection is provided on the bottom side of its free end with an engaging nipple which is aimed at engaging holes or recesses arranged in eccentric circle on the top side of said bell domes.

6. A telephone subset according to claim 1, in which the base plate of a terminal box is provided with hook-shaped hold members serving to mount screw-type contact blades.

7. A telephone subset according to claim 6, in which a further hook-shaped hold member is provided in a central position on said base plate, on to which a protective cover may be inserted.

8. A telephone subset according to claim 7, in which the cover of said terminal box is provided on its top side with a recess engaged by said hold member through which said hold member can be unlatched, and which is capable of being locked or closed by means of a sealing disk.

* * * * *